(12) United States Patent
Finke et al.

(10) Patent No.: US 12,318,944 B2
(45) Date of Patent: Jun. 3, 2025

(54) METHOD FOR AUTOMATICALLY SCHEDULING THE TIMING OF BRAKE TESTS, AND ASSOCIATED ROBOT

(71) Applicant: KUKA Deutschland GmbH, Augsburg (DE)

(72) Inventors: Markus Finke, Königsbrunn (DE); Thomas Neff, Augsburg (DE)

(73) Assignee: KUKA Deutschland GmbH (DE)

( * ) Notice: Subject to any disclaimer, the term of this patent is extended or adjusted under 35 U.S.C. 154(b) by 185 days.

(21) Appl. No.: 17/921,807

(22) PCT Filed: Apr. 23, 2021

(86) PCT No.: PCT/EP2021/060645
§ 371 (c)(1),
(2) Date: Oct. 27, 2022

(87) PCT Pub. No.: WO2021/219502
PCT Pub. Date: Nov. 4, 2021

(65) Prior Publication Data
US 2023/0173677 A1    Jun. 8, 2023

(30) Foreign Application Priority Data

Apr. 27, 2020 (DE) ...................... 10 2020 205 322.7

(51) Int. Cl.
*B25J 9/16* (2006.01)
*B25J 19/00* (2006.01)
*G01L 5/28* (2006.01)

(52) U.S. Cl.
CPC ......... *B25J 9/1674* (2013.01); *B25J 19/0004* (2013.01); *B25J 19/0095* (2013.01); *G01L 5/28* (2013.01)

(58) Field of Classification Search
CPC .. B25J 9/1674; B25J 19/0004; B25J 19/0095; G01L 5/28; G05B 2219/41279
(Continued)

(56) References Cited

U.S. PATENT DOCUMENTS 5,144,213 A * 9/1992 Sasaki ................. G05B 19/416
                                                            318/569
5,783,922 A * 7/1998 Hashimoto ............ B25J 13/02
                                                            318/568.14

(Continued)

FOREIGN PATENT DOCUMENTS

CN    102150023 A    8/2011
CN    109571549 A * 4/2019 .............. B25J 17/00
(Continued)

OTHER PUBLICATIONS

European Patent Office; Search Report in related International Patent Application No. PCT/EP2021/060645 dated Jul. 9, 2021; 3 pages.

(Continued)

*Primary Examiner* — Jaime Figueroa
(74) *Attorney, Agent, or Firm* — Dorton & Willis, LLP (57) ABSTRACT

A method, a robot, and a robot controller for automatically scheduling the timing of a plurality of brake tests, that succeed one another at time intervals, at a plurality of brakes of a robot arm equipped with a plurality of joints and a plurality of links connecting the joints to one another and is connected to a robot controller which is designed and configured to control the joints and the brakes, in order to move the robot arm. At least one individual parameter is configured for each of the brakes. A brake test method associated with the robot arm is automatically initialized, and the initialized brake test method is automatically carried out in accordance with the configured parameters.

13 Claims, 3 Drawing Sheets

(58) Field of Classification Search
USPC .............. 700/245–264; 318/568.11–568.25
See application file for complete search history.

(56) References Cited

U.S. PATENT DOCUMENTS

| | | | | |
|---|---|---|---|---|
| 6,778,867 | B1* | 8/2004 | Ziegler | B25J 9/1674 |
| | | | | 318/563 |
| 8,069,714 | B2* | 12/2011 | Ortmaier | B25J 13/085 |
| | | | | 73/121 |
| 8,099,193 | B2* | 1/2012 | Bird-Radolovic | B25J 9/1674 |
| | | | | 318/371 |
| 8,172,048 | B2* | 5/2012 | Jonsson | F16D 66/02 |
| | | | | 188/158 |
| 8,219,245 | B2* | 7/2012 | Merk | B25J 9/102 |
| | | | | 700/250 |
| 8,751,040 | B2* | 6/2014 | Wells | B25J 19/0004 |
| | | | | 700/245 |
| 9,021,873 | B2* | 5/2015 | Shikagawa | B25J 9/1674 |
| | | | | 73/121 |
| 2007/0265731 | A1* | 11/2007 | Merk | B25J 19/0004 |
| | | | | 700/245 |
| 2008/0140321 | A1* | 6/2008 | Blanc | B25J 9/1674 |
| | | | | 702/41 |
| 2008/0309273 | A1* | 12/2008 | Kamiya | B25J 19/0004 |
| | | | | 318/563 |
| 2009/0145699 | A1* | 6/2009 | Jonsson | F16D 66/02 |
| | | | | 188/1.11 E |
| 2009/0187277 | A1* | 7/2009 | Bird-Radolovic | G05B 19/406 |
| | | | | 700/245 |
| 2010/0058850 | A1* | 3/2010 | Ortmaier | B25J 19/0095 |
| | | | | 702/41 |
| 2011/0245970 | A1* | 10/2011 | Wells | B25J 19/0095 |
| | | | | 700/245 |
| 2014/0000355 | A1* | 1/2014 | Shikagawa | G01L 5/28 |
| | | | | 73/118.01 |
| 2015/0112481 | A1* | 4/2015 | Burns | B25J 9/1674 |
| | | | | 700/248 |
| 2015/0224646 | A1* | 8/2015 | Benali | G01L 5/288 |
| | | | | 700/245 |

FOREIGN PATENT DOCUMENTS

| | | | | |
|---|---|---|---|---|
| DE | 102008015948 | A1 | 10/2009 | |
| EP | 1574301 | A2 * | 9/2005 | ............ G05B 19/40 |
| EP | 1750188 | A1 | 2/2007 | |
| EP | 3001164 | A1 * | 3/2016 | ............ B25J 9/1674 |

OTHER PUBLICATIONS

Kuka Roboter et al. "KUKA System Software 8.3" Jan. 14, 2014 (Jan. 14, 2014), Retrieved from the Internet: http://www.wtech.com.tw/public/download/manual/kuka/krc4/KUKA%2OKSS-8.3-Programming-Manual-for-Sl.pdf [retrieved on Jun. 30, 2021] XP055819858 sections 6.20.1-6.20.2.

Abb. "SafeMovel" May 31, 2019 (May 31, 2019), Retrieved from the Internet: https://abb.s1u7ba.c7/Pages/Public/IRC5RoboticsDocumentationRW6/Controllers/Options%20for%20IRC5/en/3HAC050974-001.pdf [retrieved an Jun. 30, 2021] XP055819692 sections 2.4.1 and 4.3.5.

Chinese Patent Office; Office Action in related Chinese Patent Application No. 202180031315.0; dated Mar. 15, 2024; 8 pages.

* cited by examiner

METHOD FOR AUTOMATICALLY SCHEDULING THE TIMING OF BRAKE TESTS, AND ASSOCIATED ROBOT

CROSS-REFERENCE TO RELATED APPLICATIONS

This application is a national phase application under 35 U.S.C. § 371 of International Patent Application No. PCT/EP2021/060645, filed Apr. 23, 2021 (pending), which claims the benefit of priority to German Patent Application No. DE 10 2020 205 322.7, filed Apr. 27, 2020, the disclosures of which are incorporated by reference herein in their entirety.

TECHNICAL FIELD

The invention relates to a method for automatically scheduling the timing of a plurality of brake tests, that succeed one another at time intervals, at a plurality of brakes of a robot arm which is equipped with a plurality of joints and a plurality of links connecting the joints to one another and is connected to a robot controller which is designed and configured to control the joints and the brakes, in order to move the robot arm. The invention also relates to a robot, the robot controller of which is designed and configured to carry out a corresponding method.

BACKGROUND

WO 2007/079950 A1 describes a method for testing a braking function of a robot drive, wherein the robot drive is operated in a position-controlled manner, and a brake is actuated while the robot drive is running, and after a predetermined time period after the brake has been actuated, the speed of the robot drive is measured and the measured speed is compared with a predetermined reference value.

SUMMARY

The object of the invention is to improve the availability of a robot in its application-specific, intended use without the safety of the robot being compromised.

In accordance with the invention, the object is achieved by a method for automatically scheduling the timing of a plurality of brake tests, that succeed one another at time intervals, at a plurality of brakes of a robot arm which is equipped with a plurality of joints and a plurality of links connecting the joints to one another and is connected to a robot controller which is designed and configured to control the joints and the brakes, in order to move the robot arm, the method comprising the steps of:
  configuring at least one individual parameter for each individual brake of the plurality of brakes or together for at least two groups of brakes of the plurality of brakes, wherein the parameter in question is assigned at least one criterion, which is a property relevant for the safe operation of the brake,
  automatically initializing a brake test method which is associated with the robot arm and which is provided to control the joints and the brakes of the robot arm by means of the robot controller, thereby automatically moving the links of the robot arm according to a brake test program predetermined by the brake test method, and automatically control the brakes as a function of the configured parameters, and
  automatically executing the initialized brake test method, depending on the configured parameters, during an operating time of the robot arm, in which the robot arm is configured for its application-specific, intended use.

In robots, in particular robots, which must meet certain safety requirements, as for example according to IEC 60601-1, the brakes assigned to the joints of the robot arm, the joint brakes, must be checked at regular intervals of time to determine whether they still have their necessary braking functions. For the duration of the intended use of the robot arm, the brake functions, in particular the predetermined nominal braking force of each brake, must always be ensured, in order to be able to ensure that the movements of the robot arm can be stopped at any time in an emergency and the robot arm no longer executes a dangerous movement in an emergency. IEC 60601-1 relates to medical electrical devices and ISO/TS 15066 relates to robots with human-robot collaboration in the industrial environment. That is to say, a brake test is always necessary where a faulty brake results in a risk for people, such as operators, patients or engineers. Whether a risk exists must be determined by means of risk analyses of the application by the integrator. In the medical environment, this is to be considered particularly by the presence of a patient.

The brakes are checked by means of brake tests. Different types of brake tests can be performed. One possible type of brake test is to automatically close the particular brake to be tested and then drive the motor of the joint of the robot arm to which the closed brake is assigned. In this case, the motor tries to move the joint even though the brake is closed and, in the case of correct functioning of the brake, the joint nevertheless does not move. The motor is automatically driven in such a way that it applies at least one such torque to the joint which corresponds at least to the nominal torque of the assigned brake. A higher torque can also be applied by the motor to the joint. The joint is automatically monitored as to whether it is moving. If the joint does not rotate even with an applied maximum torque, it is assumed that the brake is sufficiently functional.

In addition to this described type of brake test, the brake test can optionally also be carried out differently. Thus, it can be provided that the drive torque at the motor is increased not only up to the nominal torque of the brake in question, but is even significantly increased, until the joint actually starts to rotate, despite the closed brake. As a result, the actual nominal torque of the brake can be determined. A further type of brake test can be to move the joint of the robot arm when the brake is open and to close the assigned brake during the movement and to automatically detect whether the rotational movement of the joint is slowed down and the movement of the joint comes to a standstill.

All the possible types of brake tests are usually carried out repeatedly at regular intervals of time, so that the brakes are continuously checked and thus it can be ensured continuously that the robot arm can be operated safely. If an insufficient or faulty function of a brake is determined by a brake test, a further operation of the robot arm can be automatically prevented. In this case, for example, a maintenance check can be initiated on the robot arm and further operation of the robot arm can be released again only when the brake in question is again brought into a reliably functional state, for example by replacing a defective brake and replacing it with a new, functional brake.

The execution of the brake tests repeatedly at regular time intervals can be scheduled automatically. Such automatic scheduling can comprise specifications of time intervals at which such brake tests are to be carried out and, if necessary, of points in time at which such brake tests are to be carried out. The scheduled brake tests can be initiated automatically by a robot controller of a robot comprising the robot arm. In this case, an interruption of a running user program, which automatically specifies the movement sequences of the robot arm according to a user application, is enforced or a starting of such a user program can be prevented. For example, it can be provided that a brake test is carried out daily, specifically before the start of a "shift" with the user program for the movement sequences of the robot arm, or for example it can be provided that a brake test is carried out at a certain time, for example at night, at a time when the robot arm is not in operation according to the user program.

Usually, in the case of previously known brake tests, all brakes of all joints of the robot arm are always tested in the context of a jointly performed uniform brake test. If only a single brake does not pass the brake test, i.e. any single brake is classified as not safe, the robot arm is transferred to a safe state by the fact that a start or further operation of a user program is no longer possible.

In robots for medical applications, for example, the requirements of IEC 60601-1 must be met, which states that in the event of a fault, a measure must always exist, in order to be able to stop the robot. In the event of a fault, patient safety must remain ensured. In the case of a robot in the medical environment, this means that current movements have to be stopped and further movements must be prevented. This ensures patient safety in medical applications.

If a robot, such as a lightweight robot, which can be operated in a force-controlled and/or torque-controlled manner, is held in the normal case in its position control and the brake is used as a safety measure, which stops the robot in the event of a fault, the state of the brakes must additionally be checked at regular intervals, in order to ensure that they are always operational. This is carried out by means of a corresponding brake test method, i.e. by a special software, and the brakes are thus monitored.

The execution of the brake test has hitherto been necessary, for example, after each restart and then at the latest after 24 hours of continuous operation, wherein such a daily cycle can, for example, be shifted three times by up to 8 hours.

If a brake test fails, or the time period expires, the robot is automatically stopped and can only be used again after a renewed brake test has been successfully performed. If the brake test (still) fails, a second test is automatically performed immediately thereafter. If this test also fails, movements of the robot are completely prevented by means of the brake test method, and a service technician must be assigned with, for example, checking the robot and, if necessary, non-operational brakes must be repaired or replaced with functional brakes.

The user is informed of the need for the brake test in good time before the time period has expired, for example one hour beforehand. However, the execution of the test must include all brakes of the robot and the result for the evaluation of the robot corresponds accordingly to the worst brake of all brakes.

These boundary conditions limit the use of the robot very strongly and, for example, place heavy restrictions on a system integrator that configures the robot for the user, in respect of integration into the workflow. In particular, an evacuation, i.e., removal of the robot arm from an operating field of a medical workplace, for example, is significantly more difficult if the complete robot is shut down fundamentally in the event of a fault, although in this situation no brake test can be carried out in the direct environment of the patient and OP personnel. This is all the more critical, since not all brakes carry the same risk potential in the event of a fault. The risk potential depends in particular on which joint of the robot arm is affected, i.e. at which joint of the robot arm a supposedly unsafe brake was detected by the brake test. Thus, for example, in the case of brakes with gravity-loaded joints, there is an increased risk in contrast to brakes at joints that are not gravity-loaded.

An aim of the invention can be to reduce the strong restrictions during the performance and monitoring of the known brake tests, in order to enable easier integration into the working sequence by the user of the robot.

The flexibility and dynamics can be increased in that the brake test no longer considers all brakes of the robot arm as a unit, but each individual brake or possibly different groups of a plurality of brakes are individually considered and evaluated.

The risk potential which starts from a defective brake can be better assessed by the system integrator for a specific application of the robot, since this, among other things, also depends for example on the installation position of the robot arm, the tool fastened to the flange of the robot arm, optionally including loads, and the fact of whether there are people stood in the vicinity of the robot arm.

In this way, although the system integrator is responsible for considering the risk potentials of the brakes in their own risk assessment, it becomes much more possible to adapt the execution of the brake tests for each brake individually to the application of the brake. For example, in the risk assessment, it could be that only the joints of the hand axes have an increased risk and therefore have to be tested regularly, for example daily, while the other axes of the other joints with a low risk have to be tested for example only once a week because, due to the installation position of the robot arm in the specific application, an unintentional movement of the robot arm can occur only in the event of a failure of exactly these brakes and a failure at one of the other joints does not lead to unintentional movement of the robot arm. This can be the case, for example, for joints of the robot arm, which are able to rotate exclusively about an axis of rotation which is always vertical and which therefore does not act in a gravity-loaded manner. The failure of a brake then does not lead to any unintentional movement of the robot arm at such a joint axis.

The responsibility for this adaptation then lies with the system integrator, wherein the standard setting from the factory, as previously, would be the need to perform the brake test daily.

The advantages described below may result. An easier integration into the operator's workflow can result. The cycle of a brake test can be carried out more quickly, since not all brakes now have to be tested in a complete run, but instead each brake can be tested individually and optionally according to different criteria based on requirements. This is the case in particular in the repeated test of a single brake, and should not consist of a first brake test. Accordingly, the robot must still be shut down only when a specific brake does not successfully pass the brake test several times in succession. A further advantage can be that it is possible to react dynamically to the state of the robot.

The time window within which a brake has to be tested is thus configurable with the method according to the invention, so that it is possible to react dynamically to the process, the specific application or use, the risk assessment and/or also the state of the brake itself.

For each brake, an individual cycle within which the brake must be tested can be defined for this purpose, otherwise further movements of the robot are prevented.

The time window for performing the brake test can be dynamically adapted, wherein, for example, the following criteria can be used.

With regard to a risk assessment, an initial and/or static definition of a brake test cycle can be carried out. Another criterion can be the state of the brake. A brake which reached, for example, 150 percent of the necessary nominal holding torque during the last-performed brake test has to be tested less frequently than a brake which only reached 105 percent of the necessary nominal holding torque during the last-performed brake test.

Furthermore, application-specific triggers, i.e. initiators, can be defined, which trigger an automatic execution of the brake test. These may be the time intervals. Most processes also run cyclically in one application. Thus, the brake test can, for example, always be carried out after the restart of the robot controller, or for example can always be carried out at 12:00 pm, midday. However, external triggers or initiators can also be defined. For example, in an application process it is intended to wait for another sub-process, for example a second robot. This waiting time can be used to carry out a brake test, wherein it can also be provided that only exactly the brake for which the brake test is next overdue is automatically tested. Alternatively or additionally, a spatial trigger can be provided. For example, once the robot arm has been moved into a certain position, the execution of the brake tests is triggered.

By means of the method according to the invention, the timings of a plurality of brake tests that succeed one another at time intervals are automatically scheduled and specifically configurable in a variable manner, depending on how the robot arm is arranged, configured, programmed and operated in its application-specific, intended use.

The robot arm has a plurality of joints and a plurality of links which are adjustable relative to each other by the movements of the joints of the robot arm, wherein a motor and a brake are assigned to each driven joint. Each motor is designed to adjust the associated joint, specifically by automatically controlling the motor, for example via a robot controller. The robot controller can be designed to automatically control the motors of the robot arm, in order to automatically and individually adjust the links of the robot arm by moving the joints in a driven manner. The robot controller can also serve to automatically control the brakes, in order to brake the joints of the robot arm individually and to hold them in a locked state.

The robot arm can be designed such that every two adjacent links are connected by a joint. In this respect, a kinematic chain of a plurality of alternating links and joints can result. The joints can be formed in particular as rotary joints. If necessary, a link or a plurality of links can be formed as a linearly adjustable joint.

In particular, a separate brake can be assigned to each joint. If necessary, a joint can also have two or more brakes, for example when a redundancy and/or diversity is to be created. Each brake can be arranged, for example, on the mounting of the joint, on a transmission of the joint or on the motor of the joint.

The robot arm can be controlled by a robot controller which is designed and configured to control the joints of the robot arm, i.e. the motors and the brakes of the robot arm. The motors and the brakes can be controlled according to a robot program which runs on the robot controller. The robot controller, in particular prompted by the robot program, controls the robot arm to move and stop or to carry out an emergency stop in an emergency.

In a first step, at least one individual parameter is configured for each individual brake of the plurality of brakes or together for at least two groups of brakes of the plurality of brakes, wherein the parameter in question is assigned at least one criterion which is a property relevant for the safe operation of the brake.

The configuration can be performed, for example, in that a user selects corresponding possible parameters and enters desired parameter values via input means of a computer which is connected to the robot controller. The parameter values, for example, can be freely typed in numerically. Alternatively or additionally, desired parameter values can be selected, for example, from a set of predetermined parameter value specifications. A selection can be made, for example, by means of a menu of an input interface displayed on a screen by clicking with the input mouse or by selecting a key on a computer keyboard.

As an alternative to a manual input of the parameter values, the parameter values can also be provided predetermined, for example by importing a configuration file containing the parameter values, which can have been created in advance and which, at the time of the configuration of the specific robot, can be imported into the robot controller of the robot arm, i.e. can be loaded. If the robot controller is integrated into a data network, the parameter values and/or the configuration files can be loaded into the robot controller via the network.

Individual parameters can be defined for each joint of the robot arm and/or for each brake of the robot arm, and individual parameter values can be determined for each joint of the robot arm and/or for each brake of the robot arm. However, it is not necessary to define different parameters for all joints and all brakes and to assign different parameter values. Rather, groups of several joints and/or groups of multiple brakes can also be assigned the same parameters and/or the same parameter values. However, according to the invention, at least two groups of joints and/or brakes are always to be defined, to which at least different parameter values are assigned. As parameters, the at least two groups of joints and/or brakes can optionally have identical types of parameters or can have different types of parameters.

The parameter can be, for example, the installation position of the robot arm, i.e. the orientation of the base frame of the robot arm in the mounting position of the robot arm. In the case of the base frame, this parameter correlates, for example, with the spatial position of the axis of rotation of the first joint of the robot arm, wherein the counting starts at the proximal end of the robot arm, i.e. at the base frame, and ends at the distal end of the robot arm, i.e. at the tool flange of the robot arm.

The criterion is the specific feature of the parameter, i.e. the property of the relevant distinction in the parameter. Thus, for example, in the case of the mentioned installation position of the robot arm as a parameter, the associated criterion can be the orientation in space with respect to the direction of gravity, i.e., for example, the criterion can be the vertical orientation or can be the horizontal orientation, for example.

Another exemplary criterion can be, for example, the specific arrangement of the tool on the flange of the robot arm. In the case of an articulated arm robot with, for example, seven axes, i.e. seven rotary joints and seven brakes, the seventh rotary joint can move the flange of the robot arm to which the tool is fastened. If the tool is shown in an abstract manner, approximately like a sphere, and is arranged with its ball center on the axis of rotation of the seventh rotary joint, a failed or a poorly functioning brake cannot represent a high risk at this seventh rotary joint, since no movement or at least no significant movement of the tool can take place even in the event of a failure of precisely this brake of the seventh joint. This assumes, however, that the other brakes are still sufficiently functional. In such a case, the parameter can be the form and the arrangement of the tool, possibly also its weight, and the criterion can be the eccentricity of the center of mass of the tool with respect to the axis of rotation of the seventh rotary joint.

However, if the tool is, for example, approximately rod-shaped and optionally also sharp-edged, such as a scalpel guided by the robot arm, a failed or a poorly functioning brake can represent a particularly high risk at this seventh rotary joint. In such a case, the seventh rotary joint of the robot arm would be configured with a very high risk.

Accordingly, the parameter can also simply be a risk parameter or a risk factor. In such a case, the criterion can be a number or a numerical factor in which, for example, it can be defined that this lies numerically between 0 and 100 and the greater the number, the higher the risk. Thus, in a simple embodiment of the invention, each joint or each brake can also be assigned only one such risk parameter or risk factor, wherein a different numerical value can be configured for each individual joint or each individual brake or each group of joints or groups of brakes.

Accordingly, at least one criterion can be assigned to each parameter. However, a plurality of different parameters can also be assigned to each brake or each group of brakes, and/or a plurality of different criteria can be assigned to each parameter.

In a second step, a brake test method is automatically initialized which is associated with the robot arm and which is provided to control the joints and the brakes of the robot arm by means of the robot controller, thereby automatically moving the links of the robot arm according to a brake test program predetermined by the brake test method, and automatically controlling the brakes as a function of the configured parameters.

During the automatic initialization, the configured parameters assigned to the particular application of the robot arm can be read in, for example into a software routine which is programmed for the execution of the brake test method. Depending on their properties, the parameters read in can be applied directly or optionally further evaluated, interpreted and/or converted into suitable specifications for the individual execution of the particular brake test methods.

Various brake test methods, in particular brake test methods which are already known to the person skilled in the art, can be applied. A plurality of different brake test methods can also be provided for selection. A specific brake test method can be selected automatically, for example as a function of a parameter assigned or assignable to the particular brake test method, depending on how it is configured. The brake test method is generally provided to control and automatically move the joints and the brakes of the robot arm by means of the robot controller. In this respect, the brake test method can be predetermined by a brake test program, i.e. can be defined by the latter.

The brake test method automatically controls the brakes, specifically depending on the initialized configuration.

In a third step, the initialized brake test method is thus automatically executed depending on the configured parameters, during an operating time of the robot arm, in which the robot arm is configured for its application-specific, intended use.

In a first variant, the brake test method can be automatically initialized in such a way that, depending on the configured parameters, corresponding brake tests are carried out at each individually configured brake of the plurality of brakes or at the brakes of the plurality of brakes configured together in at least two groups at individual, different times and/or in individual, different time intervals.

Thus, it can be provided, for example, that brakes which, according to the configuration, carry a higher safety risk are more frequently tested by a brake test method than brakes which, according to the configuration, carry a lower safety risk. In addition, it can be provided, for example, that brakes which, according to the configuration, carry a higher safety risk are tested several times during the daily period of use of the robot arm by means of the brake test method, and brakes which, according to the configuration, carry a lower safety risk are tested only once during the day or even only once during the week by means of the brake test method, wherein this less frequent brake test is then optionally carried out only outside the daily period of use of the robot arm, i.e., for example, at night or at the weekend.

As a result, the frequency of brake testing can be reduced, which has the consequence that the availability of the robot arm for its intended use can be increased. If, for example, only a single brake has to be tested during the day, the duration of the brake test methods carried out during the day is reduced. Likewise, depending on the selection of the brake test method, the requirement for the free working space during the brake test can also decrease if only a reduced number of brakes have to be tested. This has advantages when the brake test needs to be carried out during the actual operation of the robot; in contrast, for example, to a morning setup mode before the actual operation.

In a second variant, which can be provided as an alternative or in addition to the other variants, the brake test method can be automatically initialized, based on at least one individually configured parameter for each individual brake of the plurality of brakes, or together for at least two groups of brakes of the plurality of brakes, which is a criterion of the mounting position of the robot arm in the state of the robot arm configured for the application-specific, intended use.

The parameter can thus be the installation position of the robot arm, i.e. the orientation of the base frame of the robot arm in the mounting position of the robot arm. In the case of the base frame, this parameter correlates, for example, with the spatial position of the axis of rotation of the first joint of the robot arm, wherein the counting starts at the proximal end of the robot arm, i.e. at the base frame, and ends at the distal end of the robot arm, i.e. at the tool flange of the robot arm.

The criterion is the specific feature of the parameter, i.e. the property of the relevant distinction in the parameter. Thus, for example, in the case of the mentioned installation position of the robot arm as a parameter, the associated criterion can be the orientation in space with respect to the direction of gravity, i.e., for example, the criterion can be the vertical orientation or can be the horizontal orientation, for example.

In a third variant, which can be provided alternatively or additionally to the other variants, the brake test method can be automatically initialized, based on at least one individually configured parameter for a single brake of the plurality of brakes or together for at least two groups of brakes of the plurality of brakes, which is a criterion of the robot tool fastened to the robot arm.

In the case of an articulated arm robot with, for example, seven axes, i.e. seven rotary joints and seven brakes, the seventh rotary joint can move the flange of the robot arm to which the tool is fastened. If the tool is shown in an abstract manner, approximately like a sphere, and is arranged with its ball center on the axis of rotation of the seven rotary joint, a failed or a poorly functioning brake cannot represent a high risk at this seventh rotary joint, since no movement or at least no significant movement of the tool can take place even in the event of a failure of precisely this brake of the seventh joint. This assumes, however, that the other brakes are still sufficiently functional. In such a case, the parameter can be the form and the arrangement of the tool, possibly also its weight, and the criterion can be the eccentricity of the center of mass of the tool with respect to the axis of rotation of the seventh rotary joint.

However, if the tool is, for example, approximately rod-shaped and optionally also sharp-edged, such as a scalpel guided by the robot arm, a failed or a poorly functioning brake can represent a particularly high risk at this seventh rotary joint. In such a case, the seventh rotary joint of the robot arm would be configured with a very high risk.

In a fourth variant, which can be provided alternatively or additionally to the other variants, the brake test method can be automatically initialized, based on at least one individually configured parameter for a single brake of the plurality of brakes or together for at least two groups of brakes of the plurality of brakes, which is a criterion of the workplace in the region of which the robot arm is configured in its application-specific, intended use.

The criteria of the workplace may be diverse. Thus, for example, brakes of a robot arm mounted on a ceiling of a room can be assigned a low safety risk if, in the event of failure of the brakes, the robot arm reaches a vertical extended position due to gravity, and in the case of such an extension movement no collision with a patient is to be feared, for example because the patient is lying on a patient table at the workplace and the tool is merely a radiation unit operating contactlessly or is a contactlessly operating receiver and the robot arm cannot reach the patient, not even in the extended position of the robot arm. However, the risk must not only relate to the patient, but must take into account all persons present. In this regard, a ceiling assembly does not have any particular risk-minimizing importance, because the risk would also generally be lower in the case of a floor-mounted robot if no contact with a person can take place. The ceiling assembly has a positive influence only when the robot is already positioned close to the extended position and would be pulled completely into the extended position by gravity instead of dropping down uncontrollably.

Another criterion of the workplace can differ, for example, in that a workplace, which is, for example, an irradiation room in which only the patient is located during the contactless treatment, can be assigned a lower safety risk, and a different workplace, which is for example an operating room in which a number of surgeons and further personnel are present and surgery is performed at the location of a patient under assistance of a surgical robot, must be assigned a higher safety risk, since even very small movement deviations from the desired movement behavior of the robot arm may present incalculable safety risks.

In a specific embodiment, the particular configured value of the individual parameter can be determined by a manual input at a control device of the robot arm and the manually entered value can be stored automatically, so that it can be retrieved during the automatic initialization of the brake test method.

The configuration can be performed, for example, in that a user selects corresponding possible parameters and enters desired parameter values via input means of a computer which is connected to the robot controller. The parameter values, for example, can be freely typed in numerically. Alternatively or additionally, desired parameter values can be selected, for example, from a set of predetermined parameter value specifications. A selection can be made, for example, by means of a menu of an input interface displayed on a screen by clicking with the input mouse or by selecting a key on a computer keyboard.

The particular configured value of the individual parameter can be directly the point in time and/or the time interval according to which the particular brake test is to be carried out at the individually configured brake of the plurality of brakes or at the brakes of the plurality of brakes configured together in at least two groups at their individual, different points in time and/or in individual, different time intervals.

Thus, the points in time and/or the time intervals for each brake or each group of brakes can be configured numerically, for example in exact clock times (e.g. 12:00 pm) or time durations (e.g. 24 hours), for example by direct manual input or by automatically reading in predetermined time data records.

It can be provided in respect of control technology that the configuration of the at least one individual parameter for each individual brake of the plurality of brakes or together for at least two groups of brakes of the plurality of brakes is possible only within a predefined permissible value range, in particular an input and/or a saving of values outside the predefined, permissible value range is automatically prevented.

These specifications can, for example, be determined by the manufacturer and can be subsequently unchangeable. It can thus be ensured that, independently of an individual configuration, brake tests are nevertheless carried out to a required minimum extent on all brakes of the robot arm.

Automatic execution of the initialized brake test method can be carried out both as a function of the configured parameters during an operating time of the robot arm, in which the robot arm is configured for its application-specific, intended use, and can be carried out as a function of measured values which are detected during the operating time of the robot arm from state measurements at the brakes of the robot arm, in particular during a corresponding execution of the brake test method at the robot arm.

It can thus be provided that the brake test method used detects measured values during the brake test by means of sensors assigned to the brakes. These measured values can, for example, be the actual braking torque values determined individually for each brake. These can, for example, be electrically determined and electronically evaluated on the basis of the motor currents of the electric motors assigned to the brakes. The measured values can be individually stored in each brake and thus can form criteria that can be assigned to a parameter in the same way. A brake which reached, for example, 150 percent of the necessary nominal holding torque during the last-performed brake test has to be tested less frequently than a brake which only reached 105 percent of the necessary nominal holding torque during the last-performed brake test.

In general, in all different embodiments of the method, it can be provided that, in addition to an automatic execution of the initialized brake test method, an additional or alternative execution of the initialized brake test method can be initiated by supplying a signal externally of the robot, in particular a process state, and/or by a spatial trigger, which is in particular the reaching of an axis limit or an axis stop of a joint of the robot arm.

Likewise, in all embodiments of the method, the parameters assigned to a particular brake of a particular joint of the robot arm can generally be assigned a first weighting for this particular joint, and the parameters of the at least one other brake of another joint of the robot arm for this other joint or these other joints are assigned a weighting different from the first weighting.

The object is also achieved by a robot comprising a robot arm having a plurality of joints and a plurality of links which are adjustable relative to one another by the movements of the joints of the robot arm, wherein each driven joint is assigned a motor and a brake, wherein each motor is designed to adjust the joint assigned to it, specifically by means of automatic control of the motor, and comprising a robot controller which is designed to automatically control the motors, in order to adjust the links of the robot arm automatically and individually relative to one another by means of driven movement of the joints, and to automatically control the brakes, in order to be able to individually brake the joints of the robot arm and hold them locked, wherein the robot controller is designed and configured to carry out a method according to the invention, as described.

The invention also relates to a computer program product, comprising a machine-readable carrier, on which program code is stored, which can be read by a robot controller of a robot, as described according to the invention, and which instructs and/or configures the robot controller to carry out a method for automatically scheduling the timing of a plurality of brake tests, that succeed on another at time intervals, as described according to the invention, when the program code is run by the robot controller.

The computer program product can be a CD, a DVD, or a USB stick, for example. However, the computer program product can also be a control card on which microprocessors are integrated. However, the computer program product can also be implemented in the form of a download that can be offered and sold over the Internet or another network.

The machine-readable carrier can thus be a CD, a DVD, or a microprocessor on which the program code is stored. However, the machine-readable carrier can also be a hard disk or an SSD drive onto which the program code has been downloaded, e.g., by means of a download—in particular, in the form of data packets.

The program code can be represented by an edited program and/or data stored on the machine-readable carrier.

By reading the edited program and/or the data, the reading robot controller is instructed and/or configured to be able to carry out the method according to the invention.

The method according to the invention is carried out when the robot controller actually runs the program code, i.e., the edited program, and/or actually processes the data accordingly.

Specific embodiments of the invention are explained in more detail in the following descriptions with reference to the accompanying figures. Specific features of these embodiments, possibly considered individually or in further combinations, can represent general features of the invention, regardless of the specific context in which they are mentioned.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
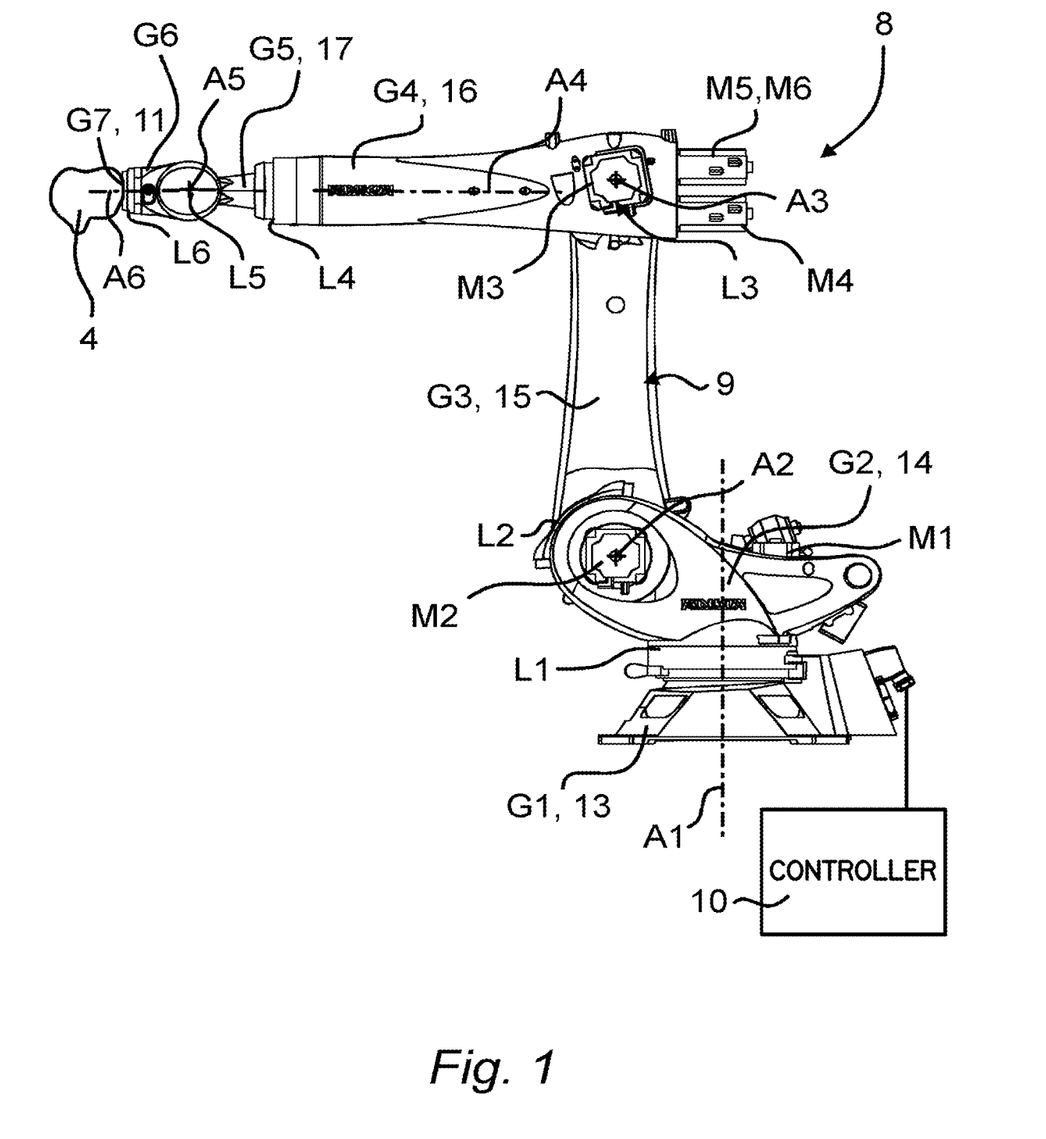
FIG. 1 shows an exemplary robot in accordance with the present disclosure comprising a robot arm with a plurality of links and a plurality of joints, wherein each joint is assigned its own motor and a separate brake, and comprising a robot controller for controlling the robot arm, in particular the motors and brakes of the joints.

FIG. 1 shows a robot 8 which comprises a robot arm 9 and a robot controller 10. In the case of the present exemplary embodiment, the robot arm 9 comprises several, successively arranged links G1 through G7 connected to one another by means of joints L1 through L6 so as to be able to rotate.

The robot 8 has the robot controller 10, which is designed to execute a robot program and to move the links G1-G7 and joints L1-L6 of the robot arm 9 automatically. One of the several links G1-G7 forms an end link (G7) of the robot arm 9, which has a tool flange 11.

The robot controller 10 of the robot 8 is designed or configured to execute a robot program by which the links L1 to L6 of the robot arm 9 can be adjusted or moved in rotation in automated fashion or automatically in a manual mode in accordance with the robot program. For this purpose, the robot controller 10 is connected to controllable electric drives, the motors M1 to M6, which are designed to adjust the various joints L1 to L6 of the robot arm 9.

In the instance of the present exemplary embodiment, the links G1 through G7 are a robot base frame 13 and a carousel 14 which is borne so as to be rotatable, relative to the robot base frame 13, about a vertically traveling axis A1. Further elements of the robot arm 9 are a link arm 15, a boom arm 16, and a preferably multi-axis robot hand 17 with a fastening device designed as a tool flange 11 for fastening a tool. The link arm 15 is mounted at the lower end on the carousel 14, i.e., at the link L2 of the link arm 15, which can also be referred to as the pivot bearing head, so as to be pivotable about a preferably horizontal axis of rotation A2.

At the upper end of the link arm 15, the boom arm 16 is in turn mounted at the first link L3 of the link arm 15 so as to be pivotable about a likewise preferably horizontal axis A3. At its end, said boom arm supports the robot hand 17 with its preferably three axes of rotation A4, A5, A6. The joints L1 to L6 can each be driven in a program-controlled manner by one of the electric motors M1 to M6 via the robot controller 10 and are braked by means of the joints L1 to L6 or brakes B1 to B6 assigned to the motors M1 to M6 and can be fixed in a locked manner.

Figure 2:
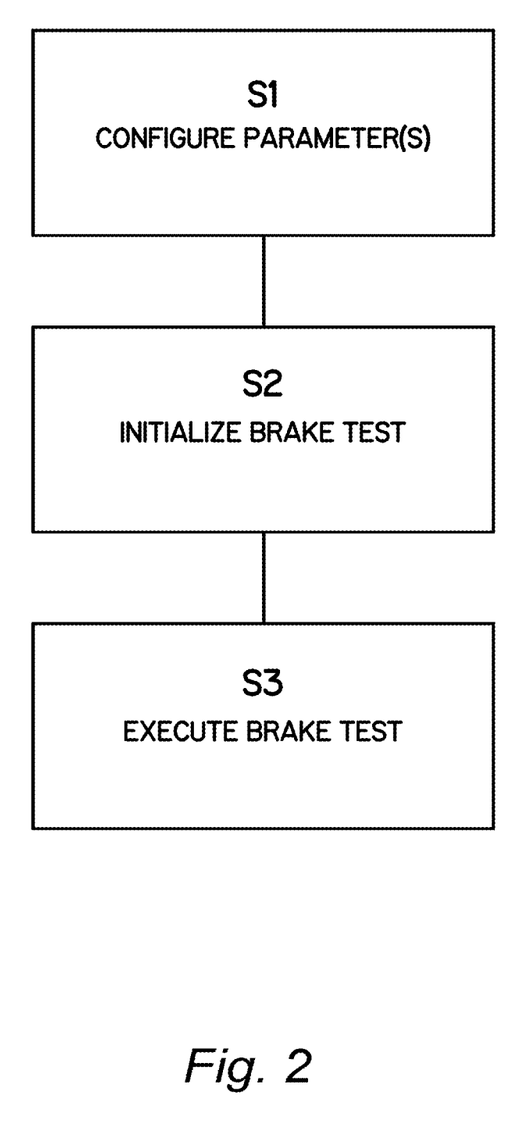
FIG. 2 shows a schematic illustration of a basic method according to the present disclosure.
Figure 3:
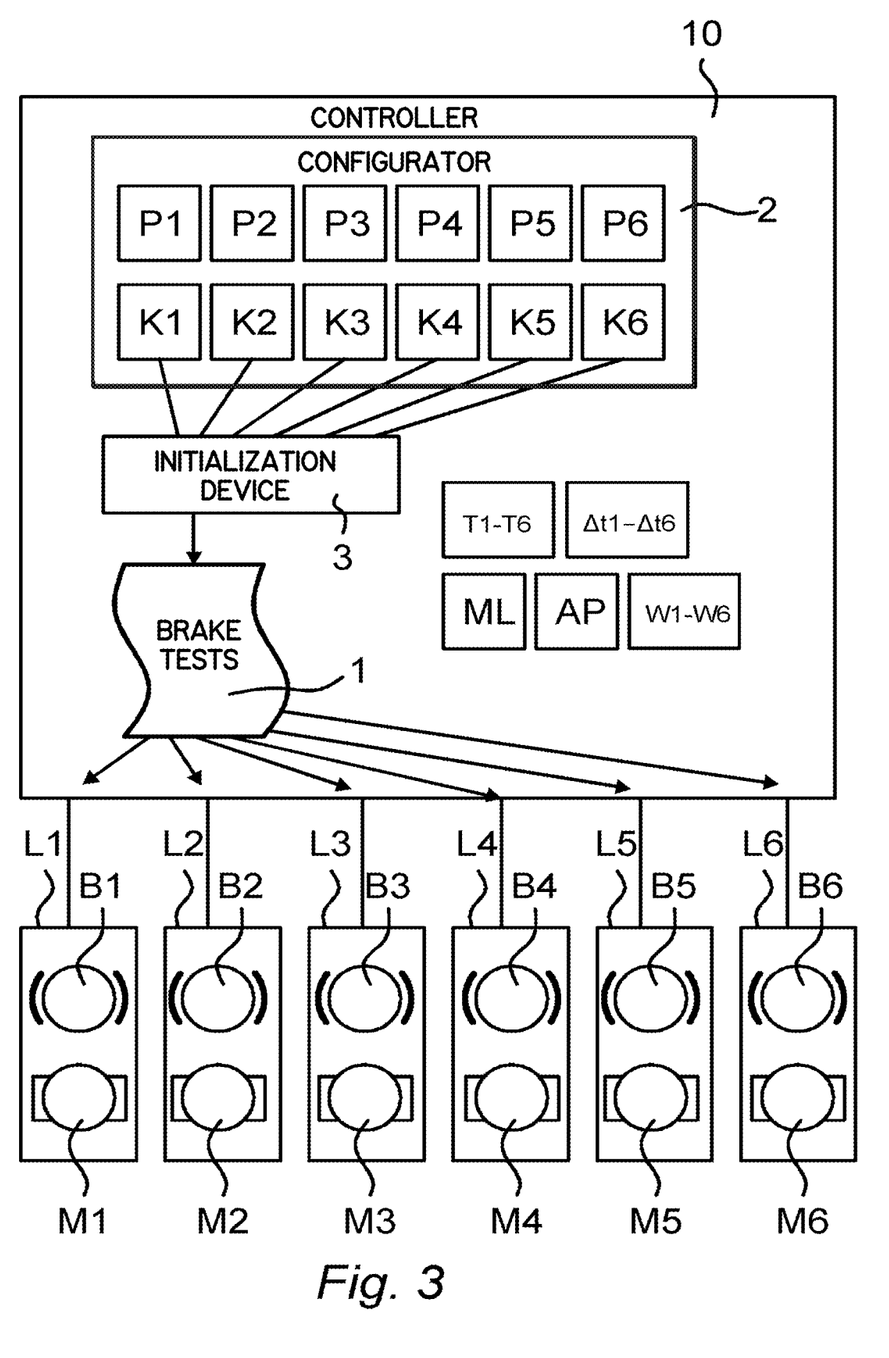
FIG. 3 shows a schematic illustration of an exemplary robot controller which is designed and configured to carry out a method according to the present disclosure.

FIG. 2 and FIG. 3 illustrate the method for automatically scheduling the timing of a plurality of brake tests 1, that succeed one another at time intervals, at a plurality of brakes B1 to B6 of a robot arm 9 which is equipped with a plurality of joints L1 to L6 and a plurality of links G1 to G7 connecting the joints L1 to L6 to one another and is connected to a robot controller 10 which is designed and configured to control the joints L1 to L6 and the brakes B1 to B6, in order to move the robot arm 9.

In the first step S1, in the case of the present exemplary embodiment, at least one individual parameter P1 to P6 for each individual brake of the plurality of brakes B1 to B6, or together for at least two groups of brakes of the plurality of brakes B1 to B6 is configured in a configurator 2 of the robot controller 10, wherein the parameter in question P1 to P6 is assigned at least one criterion K1 to K6, which is a property relevant for the safe operation of the brake B1 to B6.

In the second step S2, in the case of the present exemplary embodiment, a brake test method is automatically initialized in an initialization device 3, said method being associated with the robot arm 9 and being provided to control the joints L1 to L6 and the brakes B1 to B6 of the robot arm 9 by means of the robot controller 10, thereby automatically moving the links G1 to G7 of the robot arm according to a brake test program 1 predetermined by the brake test method, and automatically controlling the brakes B1 to B6 as a function of the configured parameters P1 to P6.

In the third step S3, in the case of the present exemplary embodiment, the initialized brake test method is automatically executed, depending on the configured parameters P1 to P6, during an operating time of the robot arm 9, in which the robot arm 9 is configured for its application-specific, intended use.

The brake test method can be initialized automatically, depending on the configured parameters P1 to P6, in such a way that corresponding brake tests 1 are carried out at each individually configured brake of the plurality of brakes B1 to B6 or at the brakes of the plurality of brakes B1 to B6 which are respectively configured together in at least two groups at individual, different times T and/or in individual, different time intervals Δt.

The brake test method can be automatically initialized, based on at least one individually configured parameter P1 to P6 for each individual brake of the plurality of brakes B1 to B6, or together for at least two groups of brakes of the plurality of brakes B1 to B6, which is a criterion of the mounting position ML of the robot arm 9 in the state of the robot arm 9 configured for the application-specific, intended use.

The brake test method can be automatically initialized, based on at least one individually configured parameter P1 to P6 for a single brake of the plurality of brakes B1 to B6 or together for at least two groups of brakes of the plurality of brakes B1 to B6, which is a criterion of the robot tool 4 fastened to the robot arm 9.

The brake test method can be automatically initialized, based on at least one individually configured parameter P1 to P6 for a single brake of the plurality of brakes B1 to B6, or together for at least two groups of brakes of the plurality of brakes B1 to B6, which is a criterion of the workplace AP in the region of which the robot arm 9 is configured in its application-specific, intended use.

The particular configured value of the individual parameter P1 to P6 can be determined by a manual input at the robot controller 10 of the robot arm 9 and the manually entered value can be stored automatically, so that it can be retrieved during the automatic initialization of the brake test method.

The particular configured value of the individual parameter P1 to P6 can be directly the point in time T and/or the time interval Δt according to which the particular brake test 1 is to be carried out at the individually configured brake of the plurality of brakes B1 to B6 or at the brakes of the plurality of brakes B1 to B6 configured together in at least two groups at their individual, different points in time T1 to T6 and/or in individual, different time intervals Δt1 to Δt6.

The automatic execution of the initialized brake test method can be carried out both as a function of the configured parameters P1 to P6 during an operating time of the robot arm 9, in which the robot arm 9 is configured for its application-specific, intended use, and is carried out as a function of measured values W1 to W6 which are detected during the operating time of the robot arm 9 from state measurements at the brakes B1 to B6 of the robot arm 9, in particular during a corresponding execution of the brake test method at the robot arm 9.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A method for automatically scheduling the timing of a plurality of brake tests that succeed one another at time intervals, at a plurality of brakes of a robot arm that is equipped with a plurality of joints and a plurality of links connecting the joints to one another, and the arm is connected to a robot controller that is designed and configured to control the joints and the brakes in order to move the robot arm, the method comprising:
    configuring at least one individual parameter for each individual brake of the plurality of brakes, or jointly for at least two groups of the brakes, wherein the at least one parameter is assigned at least one criterion that is a property relevant for the safe operation of the brake;
    automatically initializing a brake test procedure that is associated with the robot arm and which is provided to control the joints and the brakes of the robot arm via the robot controller, thereby automatically moving the links of the robot arm according to a brake test program predetermined by the brake test procedure, and automatically controlling the brakes as a function of the configured parameters; and
    executing the initialized brake test procedure based on the configured parameters and during operation of the robot to perform its application-intended specific use;
    wherein the brake test procedure is automatically initialized such that, based on the configured parameters, corresponding brake tests are carried out at each individually configured brake, or at the groups of brakes that are configured jointly in at least two groups, the corresponding brake tests being carried out at individual different times and/or in individual different time intervals.

2. The method of claim 1, wherein a value of the at least one individual parameter is determined by a manual input at a control device of the robot arm, and the manually input value is stored automatically so that the input value is retrievable during the automatic initialization of the brake test procedure.

3. The method of claim 2, wherein the value of the at least one individual parameter is at least one of the point in time or the time interval according to which the particular brake test is to be carried out at the individually configured brake, or at the groups of brakes that are configured jointly in at least two groups.

4. The method of claim 1, wherein configuring at least one individual parameter for each individual brake, or jointly for the at least two groups of brakes, is limited within a predefined permissible value range.

5. The method of claim 1, wherein configuring at least one individual parameter by at least one of inputting values or saving values outside a predefined, permissible value range is automatically prevented.

6. The method of claim 1, wherein automatically executing the initialized brake test procedure comprises executing the initialized brake test procedure as a function of:
the configured parameters during an operating time of the robot arm in which the robot arm is configured for its application-specific, intended use; and
measured values that are detected during the operating time of the robot arm from state measurements at the brakes of the robot arm.

7. The method of claim 6, wherein the measured values are detected during a corresponding execution of the brake test procedure at the robot arm.

8. The method of claim 1, wherein executing the initialized brake test procedure comprises at least one of:
automatically executing the initialized brake test procedure; or
initiating execution of the initialized brake test procedure in response to a signal supplied externally of the robot.

9. The method of claim 8, wherein the signal supplied externally of the robot is associated with at least one of:
a process state; or
a spatial trigger.

10. The method of 9, wherein the signal supplied externally of the robot is associated with a spatial trigger, and the spatial trigger corresponds to reaching an axis limit or an axis stop of a joint of the robot arm.

11. A robot, comprising:
a robot arm including a plurality of joints connecting a plurality of links that are adjustable relative to one another by the movements of the joints;
a plurality of brakes, each brake assigned to a respective one of the joints;
a plurality of motors, each motor assigned to a respective one of the joints, wherein each motor is designed to adjust the respectively assigned joint by automatic control of the motor; and
a robot controller designed to automatically control the motors in order to adjust the links of the robot arm automatically and individually relative to one another by driven movement of the joints, and to automatically control the brakes to individually brake the joints of the robot arm and hold the brakes in a locked condition;
wherein the robot controller is further designed and configured to carry out the method of claim 1.

12. A method for automatically scheduling the timing of a plurality of brake tests that succeed one another at time intervals, at a plurality of brakes of a robot arm that is equipped with a plurality of joints and a plurality of links connecting the joints to one another, and the arm is connected to a robot controller that is designed and configured to control the joints and the brakes in order to move the robot arm, the method comprising:
configuring at least one individual parameter for each individual brake of the plurality of brakes, or jointly for at least two groups of the brakes, wherein the at least one parameter is assigned at least one criterion that is a property relevant for the safe operation of the brake;
automatically initializing a brake test procedure that is associated with the robot arm and which is provided to control the joints and the brakes of the robot arm via the robot controller, thereby automatically moving the links of the robot arm according to a brake test program predetermined by the brake test procedure, and automatically controlling the brakes as a function of the configured parameters; and
executing the initialized brake test procedure based on the configured parameters and during operation of the robot to perform its application-intended specific use;
wherein the brake test procedure is automatically initialized based on at least one individually configured parameter for an individual brake, or jointly for the at least two groups of brakes, wherein the at least one parameter is at least one of:
a criterion of the mounting position of the robot arm in the state of the robot arm configured for the application-specific intended use,
a criterion of the robot tool fastened to the robot arm, or
a criterion of a workplace in a region of which the robot arm is configured for its application-specific intended use.

13. A method for automatically scheduling the timing of a plurality of brake tests that succeed one another at time intervals, at a plurality of brakes of a robot arm that is equipped with a plurality of joints and a plurality of links connecting the joints to one another, and the arm is connected to a robot controller that is designed and configured to control the joints and the brakes in order to move the robot arm, the method comprising:
configuring at least one individual parameter for each individual brake of the plurality of brakes, or jointly for at least two groups of the brakes, wherein the at least one parameter is assigned at least one criterion that is a property relevant for the safe operation of the brake;
automatically initializing a brake test procedure that is associated with the robot arm and which is provided to control the joints and the brakes of the robot arm via the robot controller, thereby automatically moving the links of the robot arm according to a brake test program predetermined by the brake test procedure, and automatically controlling the brakes as a function of the configured parameters;
executing the initialized brake test procedure based on the configured parameters and during operation of the robot to perform its application-intended specific use;
assigning a first weighting to the parameters associated with a particular brake of a particular joint of the robot arm; and
assigning a second weighting, different from the first weighting, to the parameters associated with at least one other brake associated with a different joint of the robot arm.

* * * * *